United States Patent [19]
Digel et al.

[11] Patent Number: 5,527,126
[45] Date of Patent: Jun. 18, 1996

[54] PRESS FIT

[75] Inventors: Wolfgang Digel, Kirchheim/T.; Thomas Kolb, Mühlacker, both of Germany

[73] Assignee: Mercedes-Benz AG, Stuttgart, Germany

[21] Appl. No.: 326,290

[22] Filed: Oct. 20, 1994

[30] Foreign Application Priority Data

Oct. 20, 1993 [DE] Germany .................. 43 35 779.2

[51] Int. Cl.⁶ .................................................. F16D 1/064
[52] U.S. Cl. ..................... 403/359; 83/188; 403/280
[58] Field of Search ...................... 83/188; 403/274, 403/280, 282, 283, 355, 356, 357, 358, 359, 360

[56] References Cited

U.S. PATENT DOCUMENTS

| | | | |
|---|---|---|---|
| 1,403,309 | 1/1922 | Follows | 403/282 X |
| 3,290,918 | 12/1966 | Weasler | 403/359 X |
| 3,374,015 | 3/1968 | Gies | 403/359 |
| 3,396,554 | 8/1968 | Westercamp | 403/274 X |
| 3,642,311 | 2/1972 | Edgemond, Jr. | 403/282 |
| 4,886,372 | 12/1989 | Iio | 403/282 |

FOREIGN PATENT DOCUMENTS

| | | | |
|---|---|---|---|
| 121315 | 5/1991 | Japan | 403/282 |
| 506016 | 3/1939 | United Kingdom | |
| 2029300 | 3/1980 | United Kingdom | |

*Primary Examiner*—Blair M. Johnson
*Assistant Examiner*—Andrea Chop
*Attorney, Agent, or Firm*—Evenson McKeown Edwards & Lenahan

[57] ABSTRACT

A press fit between a spline shaft and a spline hub is disclosed. The spline shaft has, on one end region, a spline-shaft toothing arranged on the outside and the spline hub has an inner spline-hub toothing which corresponds essentially to the spline shaft toothing. In the prefabricated state, the spline hub toothing is provided with an undersize in relation to the spline-shaft toothing. Those edges of the tooth flanks of the spline-shaft toothing at the front on the insertion side are designed as cutting edges which, during the insertion of the spline shaft into the spline hub come into engagement with a chipping effect on the tooth flanks of the spline-hub toothing. So as to avoid a risk emanating from these chips, the depth of insertion of the spline shaft into the spline hub is limited by a shoulder, and the distance between the cutting edge and the shoulder is smaller than the extension of the spline hub. As a result, the chips remain within the spline-hub toothing of the spline hub.

10 Claims, 2 Drawing Sheets

PRESS FIT

BACKGROUND AND SUMMARY OF THE INVENTION

The invention relates to a press fit between a spline shaft and a spline hub of the type known from German Patent Document DE 2,925,058 A1 taken as a relevant generic basis.

In driving axles of passenger cars with individually suspended vehicle wheels, for each driving wheel it is necessary to have a drive shaft with two synchronous rotary joints, the spline hub of which is pressed via a spline toothing onto the corresponding spline shaft. In view of the frequent change of the wheel torque from overrunning to traction, and vice versa, particularly in a traffic jam, a circumferential positive connection which is effective, that is to say is uniformly taut for all the shafts, and which has a high load-bearing fraction is desirable. Moreover, since axial forces act on the shaft joints during compression, a good axial connection approximately of the same magnitude for all the shafts is also required. This requirement has hitherto usually been satisfied by a suitable choice of fit. For this purpose, it is unavoidable to measure piece by piece the joint parts manufactured with high precision and to sort them into a plurality of, usually approximately six, pairing classes. Particularly large numbers of classes have resulted from this, because, on the one hand, a spline-shaft toothing has been attached to a shaft on both sides and each spline-shaft toothing can come into a different dimension class. The total number of dimension classes thus becomes the square of the number of pairing classes. However, since the method of selecting a fit has to be adopted not only for the spline-shaft/spline-hub connection, but also for the actual shaft joint, that is to say for the joint hub and the joint ring, and at least six dimension classes are likewise necessary for this purpose, at least 36 dimension classes also occur for the joint hubs. Apart from the investment outlay and amount of time required in terms of measurement, considerable outlay in terms of space and material, which ties up a large amount of capital, is necessary for an efficiently arranged stocking of the workpieces in so many dimension classes. On account of the selection of fits, reworking or a repair is also made much more difficult or expensive, because partial renewal is not possible.

A remedy is known from German Patent Document DE 2,925,058 A1 which relates to a press fit between a spline shaft and a spline hub. In this case, either the toothing of the spline shaft is hardened in relation to the toothing of the spline hub or the spline shaft, at least in the region of its toothing, is manufactured from a harder material than that of the spline hub. The splines of the spline-shaft toothing have, on their end face, a bevel which ascends into the spline hub in the direction of insertion of the spline shaft and which, inter alia, makes it easier to introduce the spline shaft into the toothing of the spline hub. The bevel has lateral edges which are designed as cutting edges and which at the same time form the end limitations of the side flanks of the spline-shaft teeth. During the axially defined pressing of the spline shaft into the spline hub, the cutting edges cut to size the material of the spline-hub toothing produced with undersize, by at least partially displacing the material of the toothing of the spline hub. As a result of this design of the spline-shaft teeth, a press fit to be made cost-effectively in this way has a high mechanical strength, and an especially high torque can also be transmitted. However, in some uses, such as particularly in rear-axle shafts, joint rings, driving bevel wheels or transmission shafts, chips occurring during a pressing operation must be carefully cleaned off the end face of the spline shaft emerging from the spline hub, since these could otherwise lead to other damage during operation of press fits of this type. However, this cleaning is time-consuming and cost-intensive. Furthermore, where pure displacement is concerned, it is necessary to bear in mind that, in this case, the outer dimensions of the spline hub are changed, because of which the outer face of the hub must in this instance be reworked.

Another possibility of avoiding the risk caused by the escaping chips is known from German Patent Document DE 3,732,223 A1. In this publication, it is proposed to provide the spline shaft profile with transverse grooves which receive a chip occurring during the pressing operation, so that it is prevented from escaping on the end face. However, this method of removing a chip entails an additional work step during the manufacture of the toothing of the spline shaft.

An object of the invention is to develop a press fit which, whilst preserving the known advantages, can be made more cost-effectively and with a good dimensional accuracy of the outer face of the hub, the risk caused by escaping chips being further reduced or prevented.

Based on the previously known press connection, this object is achieved according to the invention, by providing an arrangement wherein each tooth of the spline-shaft toothing has a nose on its tooth end face located on the introduction side, the cross-section of the nose being smaller than the cross-section of a tooth of the spline-shaft toothing, the respective side face of the nose merging into the associated cutting edge, and at least one side face of the nose, together with the opposite tooth flank of a tooth of the spline-hub toothing, forming a chip pocket.

As a result of the design according to the invention of the end face of the teeth of the spline-shaft toothing, the excess material of the toothing of the spline hub is cut out of the spline hub at most only to just in front of the exit side end region of the spline shaft out of the spline hub, so that no free chip can form at all. As a result, the displaced or cut material of the toothing of the spline hub remains, for example within the pockets of the spline hub, and preferably always has a material bond with the spline hub on the end side. Furthermore, since only a small material volume is displaced, a good dimensional accuracy of the hub is guaranteed.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
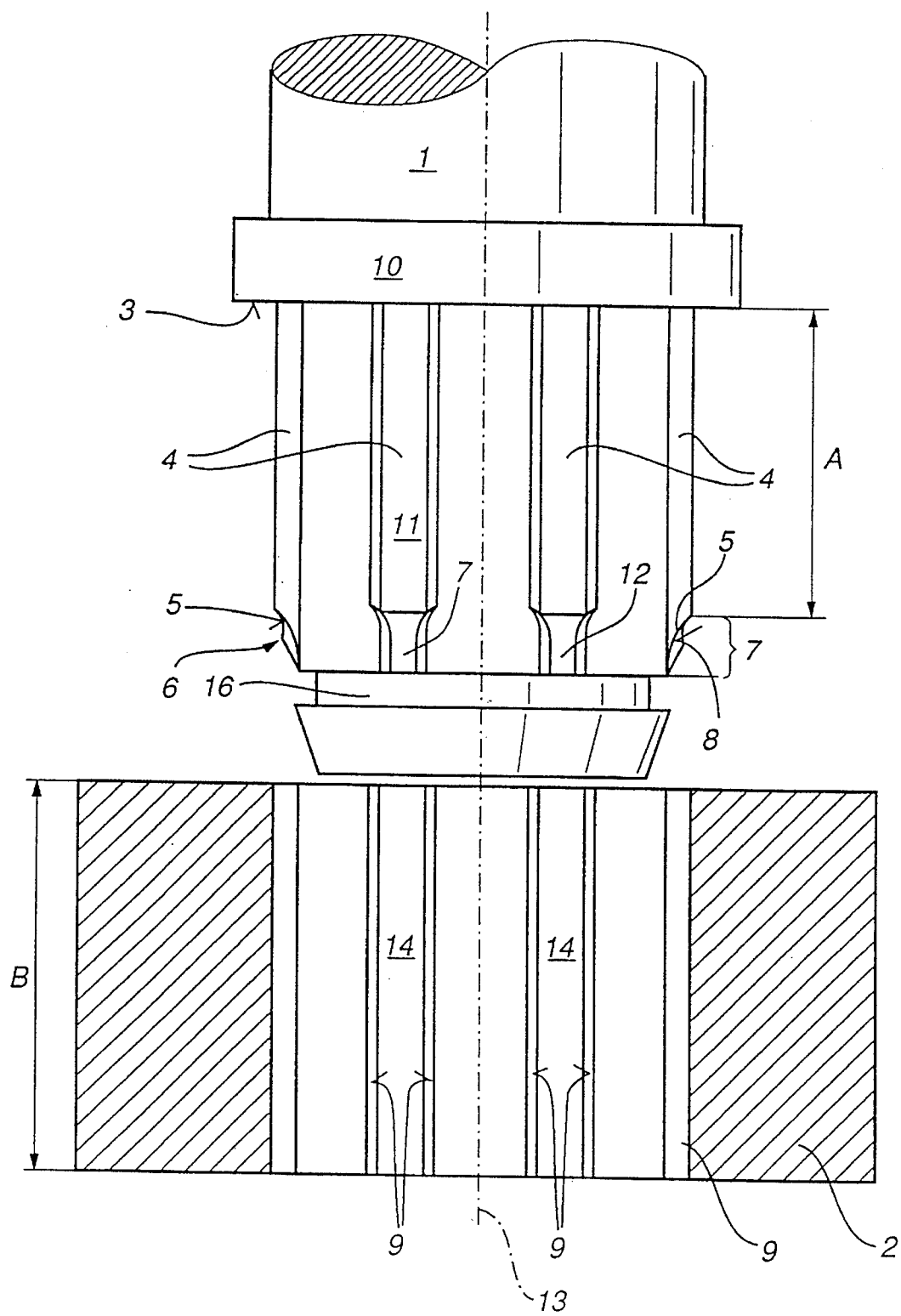
FIG. 1 shows a perspective representation of a spline shaft with an associated spline hub, the spline hub being in section along an axial plane, constructed according to a preferred embodiment of the invention.
Figure 2:
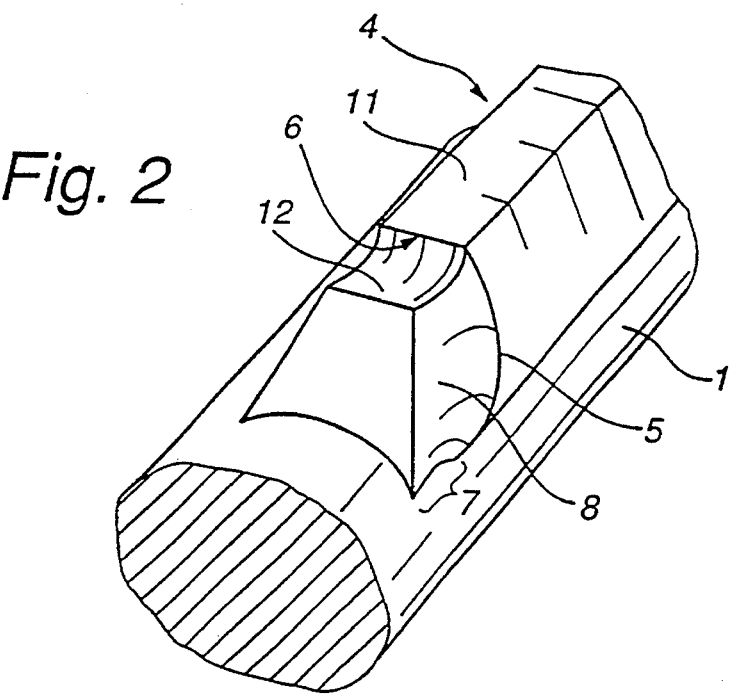
FIG. 2 shows a perspective representation of a tooth of the spline-shaft toothing of the spline shaft of FIG. 1.
Figure 3:
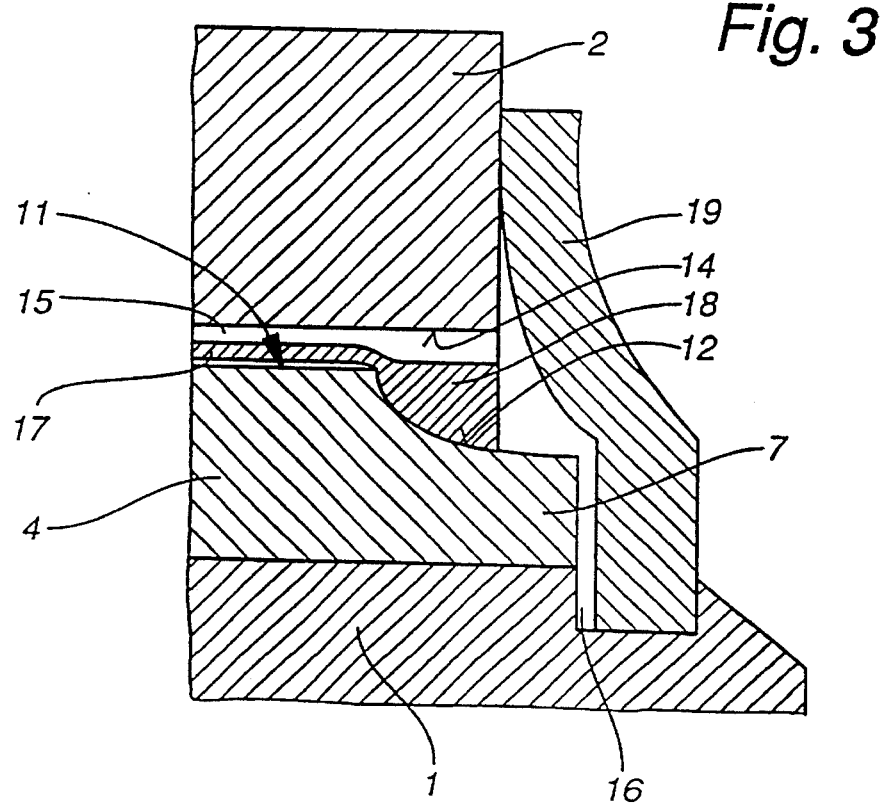
FIG. 3 shows a detail enlargement of a section through a press fit formed with the spline shaft of FIG. 1 and 2.

FIG. 1 shows a spline shaft 1 and an associated spline hub 2 before assembly. The spline shaft 1 is manufactured from a harder material than that of the spline hub 2. Spline shaft 1 has a spline-shaft toothing on its end region arranged on the outside and extending axis-parallel to the axis of rotation 13 of the spline shaft 1.

The spline hub 2 has an axially oriented bore, the surface of which is provided with a spline-hub toothing corresponding essentially to the spline-shaft toothing. However, in the prefabricated state, the spline-hub toothing has an undersize in relation to the spline-shaft toothing; that is to say, the tooth spaces of the spline-hub toothing have a clear width which is smaller than the corresponding width of the teeth 4 of the spline-shaft toothing. The depth of a tooth space or the height of a tooth of the spline-hub toothing is larger than the height measured between the tooth root and the tooth tip 11 of a tooth 4 of the spline-shaft toothing, with the result that the press fit between a tooth-space bottom 14 of the spline-hub toothing and a tooth tip 11 of the spline-shaft toothing always has a free space 15.

So that the undersize of the tooth space of the spline-hub toothing can be eliminated, those edges of the tooth flanks of the spline-shaft toothing at the front on the insertion side are designed as cutting edges 5 which, when the press fit is being made, that is to say when the spline shaft 1 is being inserted into the spline hub 2 in a pressing manner, come into engagement with a chipping effect on the tooth flanks 9 of the spline-hub toothing.

The depth of insertion of the spline shaft 1 into the spline hub 2 is limited by a collar 10 having a shoulder 3, the tooth length "A" of a tooth 4 of the spline-shaft toothing between the cutting edge 5 and the shoulder 3 being smaller than the axial extension "B" of the spline hub 2. By virtue of this design of the spline shaft toothing, the tooth flanks 9 of the spline-hub toothing cannot be cut over their length corresponding to the entire axial extension "B" of the spline hub 2, but only to just in front of the exit-side end region of the spline shaft 1 out of the spline hub 2. Consequently, no free chip 17 forms at all. On the contrary, the cut material of the chip 17, free on one side and always having a material bond 18 with the spline hub 2 on the end side, always remains within the spline hub 2. Furthermore, since only a small material volume is displaced thereby, a good, especially outer dimensional accuracy of the spline hub 2 is guaranteed.

The execution of the material bond 18 arranged on the end side and keeping the chip 17 within the spline hub 2 is favorably influenced, in that, on the tooth end face 6 of a tooth 4 of the spline-shaft toothing, there is arranged on the end face a nose 7 which forms chip pockets with the tooth flanks 9 of the opposite teeth of the spline-hub toothing. The material of the material bond 18 can spread in these chip pockets and, if appropriate, be at least partially pressed in together with material of the chip 17. To form this chip pocket, the nose 7 has a cross-section which is smaller than the cross-section of a tooth 4 of the spline-shaft toothing. In the region of the tooth end face 6 of a tooth 4 of the spline-shaft toothing, the respective side face 8 of the nose 7 which is at a distance from the opposite tooth flank 9 of the spline-hub toothing merges into the associated cutting edge 5 of the tooth 4 of the spline shaft toothing.

The cutting edges 5 are advantageously oriented tangentially relative to a cone envelope, the apex of which points in the direction of insertion of the spline shaft 1 into the spline hub 2. It has proved especially advantageous, at the same time, if the cutting edge 5 forms with the axis of rotation 13 of the spline shaft 1 an angle of between 10° and 40°, especially of between 15° and 30°. With such an inclination of the cutting edge 5 which is, of course, preceded by the side face 8 of the associated nose 7 and, in particular, is integrated thereon, the cut chip 17 flows as on a sliding face into the free space 15 formed between a tooth-space bottom 15 of a tooth space of the spline-hub toothing and a tooth tip 11 of a tooth 4 of the spline-shaft toothing.

Furthermore, the diversion of the chip 17 can also be improved if the roof face 12 of the nose 7, the said roof face 12 merging into the tooth tip 11, merges into the tooth tip 11, at least in regions, via a bevel ascending towards the shoulder 3.

This advantageous diversion of the free regions of the cut chips 17 can be recognized, inter alia, if, in a press fit made in this way, the spline shaft 1 is pulled out since, in this case, the free regions of the cut chips project from the spline-hub toothing of the spline hub 2 like hairs from the scalp opposite to the direction of insertion of the spline shaft 1 into the spline hub 2.

The spline shaft 1 inserted into the spline hub 2 as far as the shoulder 3 has an annular groove 16 in the region of its end piece coming out of the spline hub 2 again. This annular groove 16 is provided for the arrangement of a retaining ring, for example a spring ring, having a locking effect.

In a special embodiment, a retaining ring 19 can be provided with a conical outer face, the outer edge of which comes to bear against the spline hub 2 and thus at the same time covers the spline toothing. It is also advantageous here if this retaining ring arranged in the annular groove 16 can exert an axial force between the spline shaft 1 and the spline hub 2, with the result that the spline shaft 1 is additionally secured in the spline hub 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Press fit between a spline hub having spline-hub toothing and a spline shaft having spline-shaft toothing, the material of the spline-shaft toothing being harder than the material of the spline-hub toothing, the spline shaft having, on its end region, the spline-shaft toothing arranged on the outside and extending parallel to the axis of rotation of the spline shaft, the spline hub having spline-hub toothing arranged on the inside which corresponds essentially to the spline-shaft toothing and which, in the prefabricated state, is provided with an undersize in relation to the spline-shaft toothing, and those edges of tooth flanks of the spline-shaft toothing at a front on an insertion side forming cutting edges which, during the insertion of the spline shaft into the spline hub, come into engagement with a chipping effect on the tooth flanks of the spline-hub toothing, wherein the depth of insertion of the spline shaft into the spline hub is limited by a shoulder, and wherein the length of a tooth of the spline-shaft toothing between the cutting edge and the shoulder is smaller than the axial extension of the spline-hub toothing of the spline hub, and wherein each tooth of the spline-shaft toothing has a nose on a tooth end face located on an introduction side, the cross-section of the nose being smaller than the cross-section of a tooth of the spline-shaft toothing, a respective side face of the nose merging into the associated cutting edge, and at least one side face of the nose, together with an opposite tooth flank of a tooth of the spline-hub toothing, forming a chip pocket.

2. Press fit according to claim 1, wherein a roof face of the nose merges into a tooth tip via a bevel ascending towards the shoulder.

3. Press fit comprising:

a spline shaft having longitudinally extending spline teeth, a spline hub having longitudinally extending hub teeth configured to mate with corresponding ones of said spline teeth upon axial insertion of the spline shaft in the spline hub in an insertion direction, said hub teeth being undersized with respect to said spline teeth prior to said axial insertion, said spline teeth having cutting edges at an insertion end of the spline shaft, which cutting edges engage and cut respective tooth flanks of the hub teeth to thereby form a precise press fit between the spline hub and spline shaft during axial insertion of the spline shaft into the spline hub, and axially abutting stop surfaces at the spline hub and spline shaft which limit the axial insertion depth of the cutting edges so that cutting chip accommodating spaces are formed between respective insertion ends of the cutting edges and the hub teeth.

4. Press fit according to claim 3, wherein the cutting edges are oriented tangentially relative to a cone envelope, the apex of which points in the insertion direction.

5. Press fit according to claim 3, wherein the axial stop surfaces include a collar surface on said spline shaft.

6. Press fit according to claim 3, wherein the respective cutting edges form an angle of between 10° and 40° with respect to a longitudinal axis of rotation of the spline shaft.

7. Press fit according to claim 6, wherein said angle is between 15° and 30°.

8. A press fit according to claim 3, wherein said cutting chip accommodating spaces are formed at the spline shaft side by spline teeth end sections of reduced cross-sectional size as compared to the remaining portion of the spline teeth.

9. Press fit according to claim 3, wherein said spline teeth and hub teeth are configured, with a fully inserted spline shaft, to position cutting chips in said cutting chip accommodating spaces with respective cutting chips remaining connected with respective ones of said hub teeth.

10. Press fit according to claim 3, wherein said hub teeth are formed of a softer material than are the spline teeth.

* * * * *